G. A. PARMENTER.
WRENCH.
APPLICATION FILED SEPT. 28, 1916.

1,243,210. Patented Oct. 16, 1917.

Inventor:
George A. Parmenter;
by Spear Middleton Donaldson & Spear
Atty's.

UNITED STATES PATENT OFFICE.

GEORGE A. PARMENTER, OF BOSTON, MASSACHUSETTS, ASSIGNOR TO PARMENTER MANUFACTURING COMPANY, OF BOSTON, MASSACHUSETTS, A CORPORATION OF MASSACHUSETTS.

WRENCH.

1,243,210.   Specification of Letters Patent.   Patented Oct. 16, 1917.

Application filed September 28, 1916.   Serial No. 122,703.

*To all whom it may concern:*

Be it known that I, GEORGE A. PARMENTER, a citizen of the United States, and resident of Boston, Massachusetts, have invented certain new and useful Improvements in Wrenches, of which the following is a specification.

My present invention relates to improvements in pipe and nut wrenches and aims to provide a simple, economical, and efficient construction which may be easily and quickly applied to the pipe or nut by one hand, and all necessary adjustments effected by the hand which holds the operating handle.

The invention includes the novel features of construction and arrangement and combination of parts hereinafter described and defined by the appended claim.

An embodiment of my invention is illustrated in the accompanying drawing, in which—

Figure 1:
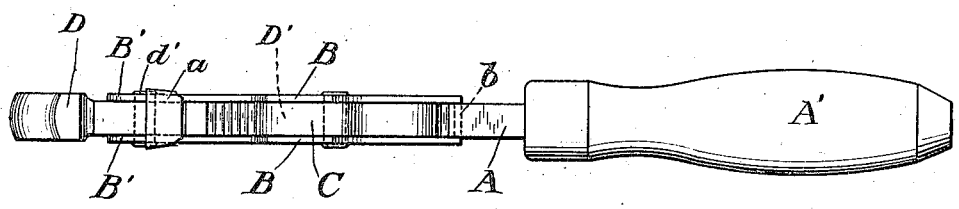
Figure 1 is a plan view of a wrench constructed in accordance with my invention.
Figure 2:
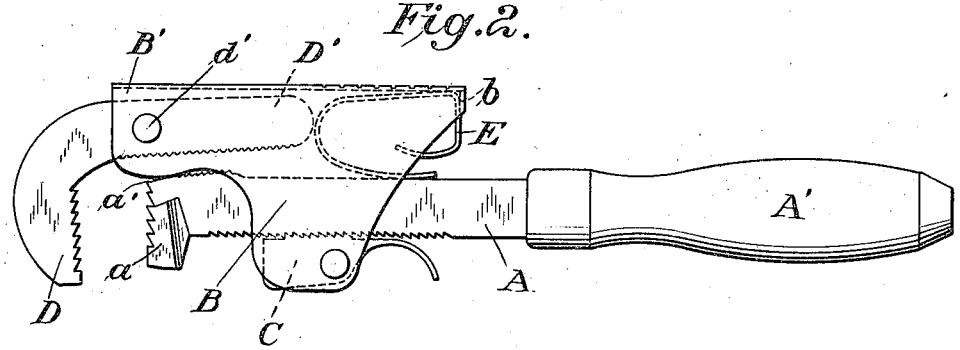
Fig. 2 is a side elevation.
Figure 3:
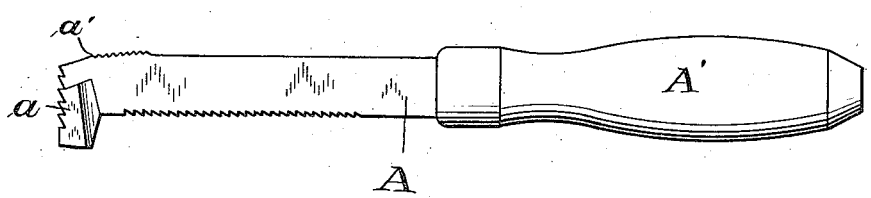
Figs. 3, 4 and 5 are views of details.
Figure 4:
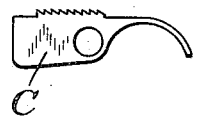
Figure 5:
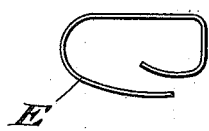

Referring by reference characters to this drawing, the handle of the wrench, which is shown at A', may be of any desired construction, and be formed integral with, or secured to the shank A in any desired manner, this shank carrying at its forward end what may be termed the fixed jaw *a* provided with pipe gripping teeth or serrations as shown.

A casing B fits over the shank and is slidable thereon and is held in any position to which it may be adjusted by a dog C having teeth or serrations designed to engage corresponding serrations on the under face of the shank.

The upper part of the casing is extended forwardly toward the fixed jaw and also rearwardly toward the handle, and between the walls of the forwardly extended portion B' is pivoted at *d'* the shank D' of the movable jaw D, which is provided with pipe engaging teeth or serrations opposed to those of the fixed jaw. Within the hollow portion of the casing above the shank A is a spring E which tends to keep the casing pressed upwardly and the teeth or serrations of the dog C in engagement with the teeth or serrations of the shank A. This spring is formed of a single piece of spring steel in split loop form and is slipped into the open space of the casing above the shank, being held therein by having its front end abutting against the rear end of the shank D' of the movable jaw and its rear end engaging a depending lip or flange *b* of the casing.

By this arrangement I am enabled to dispense with the use of rivets for securing the spring in place and also facilitate the assembling of the parts, thereby reducing the cost of manufacture. It will be seen that the shape and disposition of the spring is such that while tending to push the casing upwardly and thus hold the dog in locking engagement with the teeth of the shank A, it yet permits a free limited rocking movement of the casing on the shank, while as the dog C is pivoted to the casing its serrated face maintains its parallelism with the serrated face of shank A during such rocking movement.

The spring at the split portion, or under side, has its parts overlapping each other, the outermost portion bearing on the back of the shank and the other lying in position to form a stop to the former to limit the rocking movement so the jaws will not open unnecessarily wide.

The spring tends normally to keep the forward end of the casing tipped downwardly until the serrated under face of the shank of the movable jaw rests upon the downwardly inclined serrated portion *a'* of the shank A. With the parts in this position and supposing the movable jaw to be adjusted a distance from the fixed jaw approximating the nut or pipe to be operated upon the pressure of the pipe or nut upon the movable jaw as the wrench is applied to the article will rock the casing backwardly raising its front end. This will lift the shank of the movable jaw from the serrated face of the shank A and permit a further rocking of the shank of the movable jaw on its pivot *d'*, thus separating the jaws to permit the nut or bolt to pass readily therebetween. Movement of the handle in a downward direction causes the parts to fulcrum upon each other so that the article is gripped firmly between the two jaws.

If the size of the nut or pipe is found to require a wider space between the jaws, pressure of the thumb upon the rearwardly projected portion of the casing (which is preferably roughened as shown) tends to rock the casing backwardly and at the same time compresses the spring sufficiently to permit said pressure to cause the dog to ride over the teeth of the shank and the movable jaw to move away from the fixed jaw. For bringing the movable jaw toward the fixed jaw, if there be too great a separation, I provide the dog with a curved finger piece which may be pressed upon by the fore finger of the hand holding the wrench handle and by which the movable jaw may be retracted.

Having thus described my invention what I claim is:—

A pipe and nut wrench comprising a main shank and handle, said shank having a terminal gripping face, a casing slidably embracing the shank, said casing and shank having on one side of the shank interengaging locking parts, a jaw member having a shank pivoted within the forward portion of the casing, said casing having a projecting lip at its rear end, and a spring of substantially loop form within the casing and confined in place between the rear end of the shank of the movable jaw and said lip on the casing, said spring having overlapping portions spaced apart, one of said portions bearing against the back of the main shank and the other being adapted to act as a stop to limit the first named portion.

In testimony whereof, I affix my signature.

GEORGE A. PARMENTER.

Copies of this patent may be obtained for five cents each, by addressing the "Commissioner of Patents, Washington, D. C."